United States Patent [19]
Di Giovanniantonio et al.

[11] 3,897,920
[45] Aug. 5, 1975

[54] AIRCRAFT BARRICADE JET-NET

[75] Inventors: Perry R. Di Giovanniantonio, Philadelphia; William J. Zimmer, Morton; Charles E. Rivers, Springfield, all of Pa.

[73] Assignee: The United States of America as represented by the Secretary of the Navy, Washington, D.C.

[22] Filed: May 20, 1974

[21] Appl. No.: 471,384

[52] U.S. Cl. ............................................. 244/110 C
[51] Int. Cl.² ............................................ B64F 1/02
[58] Field of Search .......... 244/110 C, 110 R, 110 A

[56] References Cited
UNITED STATES PATENTS

| | | | |
|---|---|---|---|
| 3,069,118 | 12/1962 | Bernard | 244/110 R |
| 3,383,076 | 5/1968 | Van Zelm et al. | 244/110 C |
| 3,513,231 | 5/1970 | Bair et al. | 244/110 R X |
| 3,559,697 | 2/1971 | Whalen | 244/110 R X |
| 3,622,107 | 11/1971 | Bernard | 244/110 C |

FOREIGN PATENTS OR APPLICATIONS
859,670  1/1961  United Kingdom............ 244/110 C

*Primary Examiner*—Duane A. Reger
*Attorney, Agent, or Firm*—R. S. Sciascia; Henry Hansen

[57] ABSTRACT

A webbing assembly for arresting the motion of an aircraft, comprising three rectangular loops, each having a plurality of spaced vertical members, and constructed of nylon straps reinforced with polyurethane-coated nylon edging. The loops are joined side by side to form a barricade or net. The vertical members are each attached to the respective loops without the use of hardware, and are free to move laterally along the lengths thereof within defined limits. Upon engagement of the vertical members by the aircraft's wings, the barricade, which is attached on either side to an energy absorbing device, moves in the direction of motion of the aircraft to equalize loading and arrest the forward motion of the aircraft.

4 Claims, 5 Drawing Figures

PATENTED AUG 5 1975    SHEET 1    3,897,920

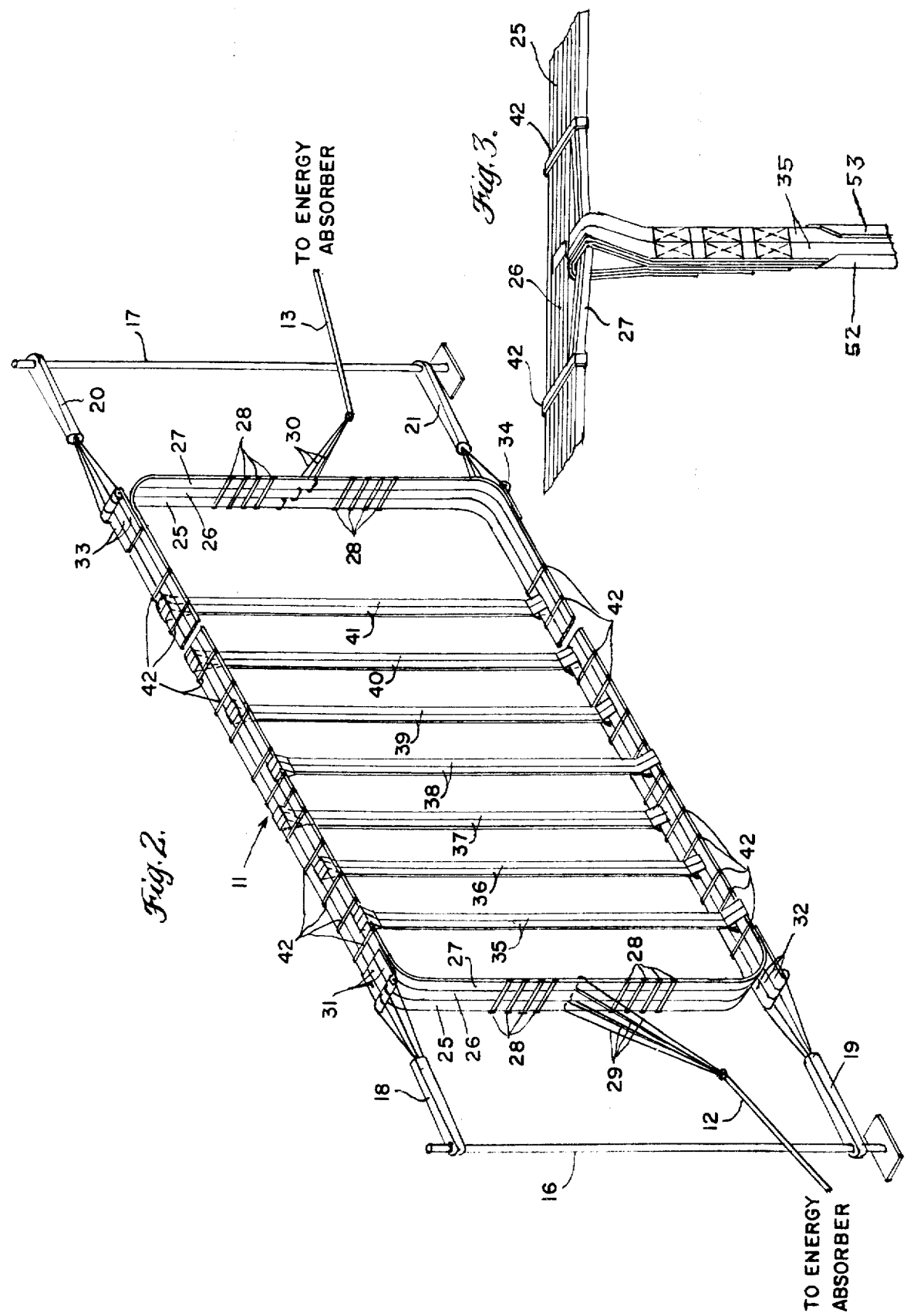

AIRCRAFT BARRICADE JET-NET

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the field of aeronautics and more particularly to retarding and restraining devices utilizing cable or net supports.

Aircraft barricades or nets are normally used as emergency devices for retarding the motion of a landing aircraft in a limited amount of space. Present emergency barricades used on aircraft carrier decks or on land runways normally consist of expendable webbing assemblies which are stretched across the path of the incoming aircraft and include some form of nylon straps or ropes connected in various configurations and attached to an energy absorbing device. These straps, or webbing as they are sometimes called, generally comprise the barricade vertical members which engage the leading edge of the aircraft wings to equalize loading and absorb the force of the aircraft's forward motion. In the past these vertical straps have shredded and torn due to cutting of strap edges by jagged wing protrusions upon violent impact of aircraft engagement. Several deleterious effects of such strap failure during an arrestment include uneven loading on the aircraft wings, uneven deceleration with possible harm to the occupants of the aircraft, and possible violent motion of the aircraft as a result of the uneven loading. Barricades were also previously fabricated using connecting hardware, causing severe damage to the aircraft fuselage and wings due to violent impact of the hardware against them.

SUMMARY OF THE INVENTION

Accordingly, it is a general purpose and object of the present invention to provide an improved, reliable, simplified, higher strength barricade for arresting the forward motion of a vehicle. It is another object to provide a barricade having polyurethane-coated nylon straps with polyurethane-coated nylon edging surrounding each strap for greater resistance to abrasion and cutting of strap edges and higher strength. It is yet a further object to provide a simplified, relatively inexpensive aircraft barricade in which all connecting hardware has been eliminated.

These and other objects are accomplished according to the present invention by an arresting barricade comprising first web means having a pair of substantially horizontal flexible members formed to be supported at their respective ends in the path of the vehicle, second web means having a plurality of substantially vertical flexible members operatively connected at their ends between the horizontal members and edging means attached to the edges of the horizontal and vertical flexible members.

BRIEF DESCRIPTION OF THE DRAWINGS

FIG. 2 is a perspective view of the components of a barricade constructed according to the invention shown in a raised, operative position prior to engagement by an aircraft;

FIG. 3 is a perspective view of the connection of a vertical strap to a strap on the upper horizontal side of the barricade shown in FIG. 2;

DESCRIPTION OF THE PREFERRED EMBODIMENT

Figure 1:
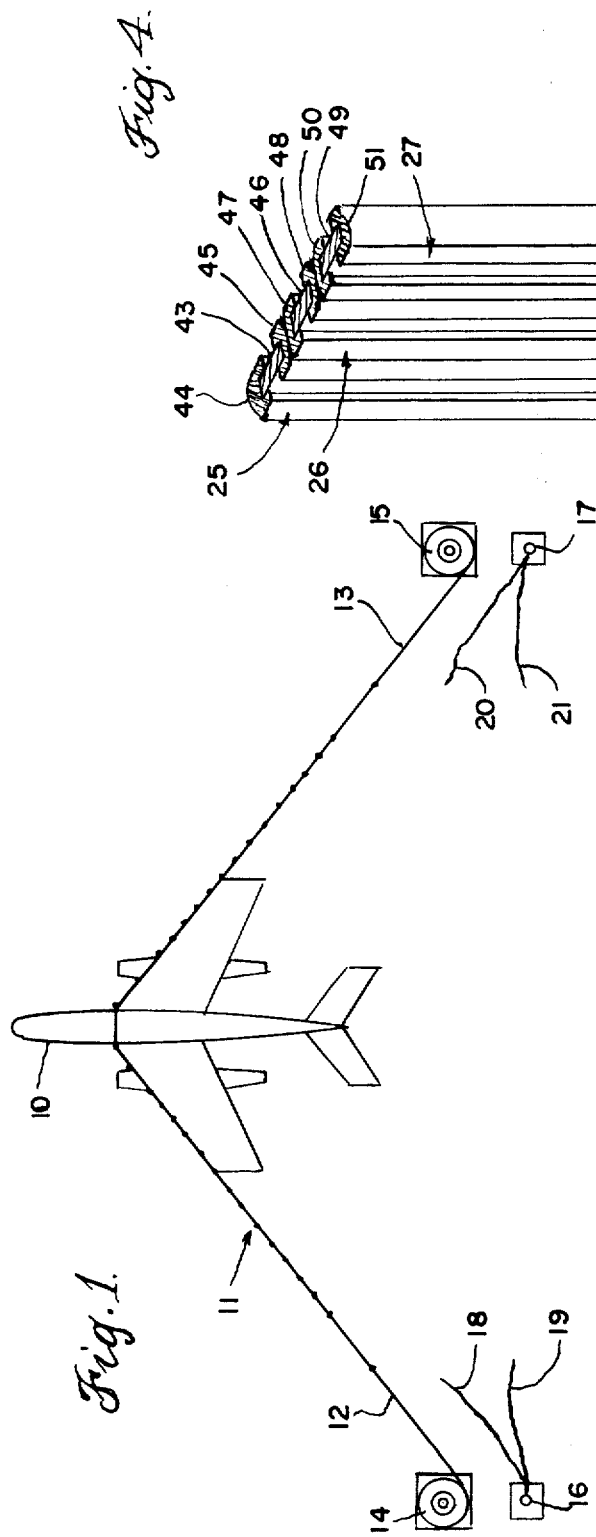
FIG. 1 represents a plan view showing engagement of the barricade by an aircraft.

Referring to FIG. 1, a winged aircraft 10 is shown engaging a barricade 11 connected by cables 12 and 13, or any other appropriate connection means, to energy absorbing devices 14 and 15, respectively, on opposite sides of a runway or deck landing area. A pair of stanchions 16 and 17 are shown adjacent energy absorbing devices 14 and 15 on the sides of the runway or landing area, with pairs of respective breakaway straps 18 and 19, and 20 and 21 loosely dangling therefrom. The breakaway straps initially are connected to the respective four corners of barricade 11 when in a fully erected position prior to engagement by aircraft 10, as shown in FIG. 2 and more fully described hereinafter. It should be noted that only the wings of aircraft 10 engage barricade 11, which is designed to move a predetermined distance in the direction of aircraft motion before completely stopping aircraft 10.

Figure 4:
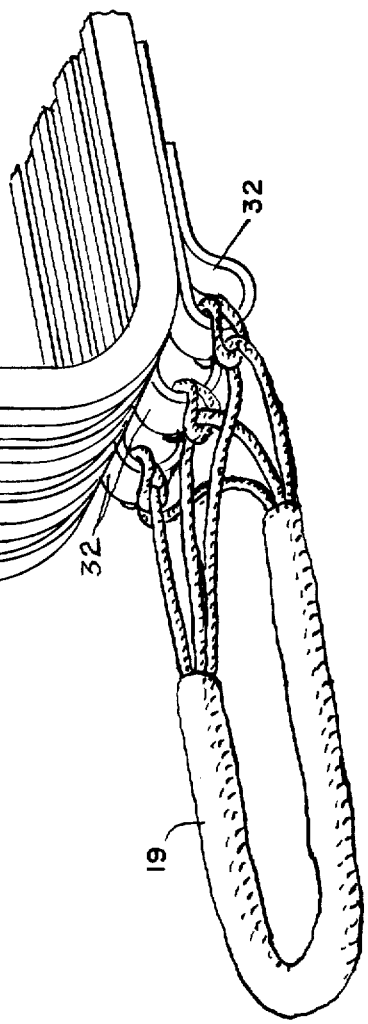
FIG. 4 is an enlarged, detailed perspective view of the rectangular barricade webbing of FIG. 2 showing a typical connection of one breakaway strap to the webbing.
Figure 5:
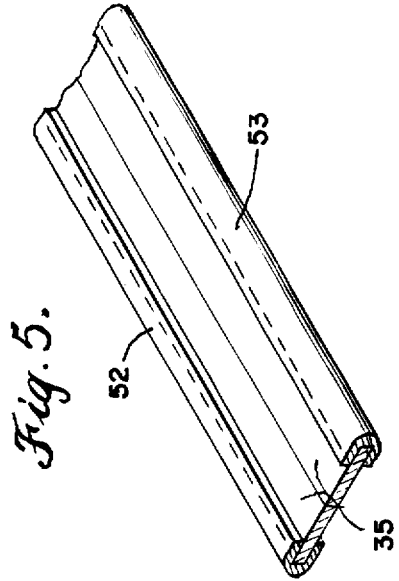
FIG. 5 is a perspective view showing details of the edging material surrounding each vertical strap of the barricade of FIG. 2.

Referring now to FIG. 2, barricade 11 is shown in a fully erected position prior to engagement by an aircraft. In a preferred embodiment, barricade 11 includes three continuous loops 25, 26 and 27 of a high strength, flexible material, such as nylon strap or webbing. It should be noted that any other suitable material may be substituted. Each loop is joined in some appropriate manner, such as by sewing, and the individual loops are fastened edge to edge in the manner shown by strap clips 28 on both vertical sides of barricade 11. Loops 25, 26 and 27 are shown broken at the top and bottom horizontal sides thereof, indicating that barricade 11 is wider than shown in FIG. 2. Extension loops 29 and 30 are fastened at their respective one ends around loops 25, 26 and 27, respectively, and are connected in common at their respective other ends to connecting cables 12 and 13 attached to energy absorbing devices 14 and 15 (not shown). Release straps 18 and 19 fastened around stanchion 16 are connected to nylon members 31 and 32, respectively, which are affixed in some appropriate manner, such as by sewing, adjacent the top and bottom of one vertical side of barricade 11. The connection of release strap 19 to member 32 is shown in greater detail in FIG. 4. Release straps 20 and 21 fastened around stanchion 17 are similarly connected to members 33 and 34 respectively, which are affixed adjacent the top and bottom of the other vertical side of barricade 11. Release straps 18, 19, 20 and 21 are used to tension barricade 11 prior to engagement, keeping it fully erect in the path of the oncoming aircraft and are designed to break away from stanchions 16 and 17 at some predetermined, relatively nominal force. Respective pairs of engaging straps 35, 36, 37, 38, 39, 40 and 41 are connected between the top and bottom horizontal sides of barricade 11 in a stepwise fashion. The engaging straps are preferably constructed of a high strength flexible material, such as nylon strap or webbing similar to barricade loops 25, 26 and 27. The engaging straps are spaced at equal intervals of approximately 4 feet across the length of top and bottom horizontal sides of barricade 11, and are free to slide within defined limits between strap clips 42 placed approximately 12 inches apart surrounding each pair of engaging straps along the respective top and bottom horizontal sides. Each pair of vertical engaging straps encircles one of barricade loops 25, 26 and 27, as shown in greater detail in FIG. 3. Each engaging strap, such as 35, is looped around a barricade loop, such as 27 and sewed. Adjacent pairs of engaging straps are attached in stepwise fashion to the barricade loops. For example, strap 35 is connected around loop 27 top and bottom, strap 36 is connected around loop 26 top and bottom, and strap 37 is connected around loop 25 top and bottom. Adjacent straps 38, 39 and 40 are similarly connected to alternate ones of loops 25, 26 and 27, the same repetitive pattern continuing across the length of the top and bottom horizontal sides. In order to prevent tearing and shredding of barricade loops 25, 26 and 27, and engaging straps 35–41, inclusive, upon engagement of barricade 11 by aircraft 10, two additional structural features have been included. All of the nylon straps or webbing are coated with a thin layer of polyurethane coating over the entire strap area. In addition, each individual strap includes a U-shaped, polyurethane-coated nylon edging material. For example, as shown in FIG. 4, loop 25 is comprised of strap 43 surrounded by edging materials 44 and 45; loop 26 is comprised of strap 46 surrounded by edging materials 47 and 48; and loop 27 is comprised of strap 49 sourrounded by edging materials 50 and 51. As shown in FIG. 3, vertical engaging straps 35–41 are similarly constructed of a flat strap, such as 35 surrounded by U-shaped edging materials such as 52 and 53. The vertical straps may or may not be covered with polyurethane coating, but due to the requirement that they remain flexible during engagement by an aircraft, they are preferably not coated in the present preferred embodiment. FIG. 5 more clearly shows the construction of a single strap, including edging material on each side. For illustrative purposes, strap 35 is shown with edging materials 52 and 53 encompassing the edges thereof. Edging materials 52 and 53 are preferably nylon strap, similar to strap 35, which is bent around each respective edge and permanently attached, such as by sewing. It can be seen that a narrow portion in the middle of strap 35 is not covered by edging materials 52 and 53. It can be seen from the foregoing description that no hardware is used in the assembly of barricade 11, thus avoiding impact of such hardware against the wings and fuselage of aircraft 10 with resultant damage.

Having thus described the present invention, some of the many advantages thereof should now be readily apparent. The novel preferred embodiment barricade affords a simplified, higher strength, more reliable and efficient aircraft energy absorber. The polyurethane-coated nylon edging used on all straps practically eliminates all tearing and shredding of the barricade during arrestment and affords protection against cutting and abrasion of the straps. Joining of the loops and vertical straps by sewing rather than attachment by hardware reduces overall barricade cost and number of parts necessary, while increasing reliability and eliminating damage to the aircraft during arrestment.

Obviously many modifications and variations of the present invention are possible in light of the above teaching. It is therefore to be understood that within the scope of the appended claims the invention may be practiced otherwise than as specifically described.

What is claimed is:

1. An arresting barrier for arresting aircraft having a fuselage and wings of predetermined size, comprising:
    a plurality of barrier elements;
    each of said barrier elements including a continuous loop having upper and lower vertically spaced horizontally disposed sides and two horizontally spaced vertically disposed sides;
    each of said barrier elements further including a plurality of horizontally spaced vertically disposed engaging straps each strap having two end portions respectively encircling said upper and lower vertically spaced horizontally disposed sides of said continuous loop to thereby slidably attach said strap to said loop;
    said loop and each of said straps having an edge protector attached to and covering each edge thereof, said edge protector having a U-shaped transverse cross section;
    said barrier elements juxtaposed in substantially parallel planes, corresponding straps of respective barrier elements being horizontally offset relative to each other to thereby define a plurality of openings, each opening having a horizontal dimension sufficient to permit passage of a portion of the fuselage of an aircraft to be arrested while preventing passage of the wings of said aircraft.

2. An arresting barrier according to claim 1 further including:
    a plurality of strap clips attached to each of the upper and lower horizontally disposed sides of each continuous loop, said strap clips disposed in corresponding pairs on said upper and lower sides, wherein, corresponding pairs are associated with a particular engaging strap and each clip of a pair is horizontally offset with respect to the other clip to thereby define a predetermined sliding distance for said engaging strap.

3. An arresting barrier according to claim 2 further including:
    means attached to the vertically disposed sides of said loop for connecting each said side to a corresponding energy absorber; and
    means attached to the horizontally disposed sides of said loop for connecting each said side to a corresponding stanchion.

4. An arresting barrier according to claim 3 wherein said straps, said loop and said edge protector each comprise a nylon webbing having an abrasion resistant coating thereon.

* * * * *